(No Model.)
O. LESTINA.
PIANO PEDAL.
No. 392,737. Patented Nov. 13, 1888.
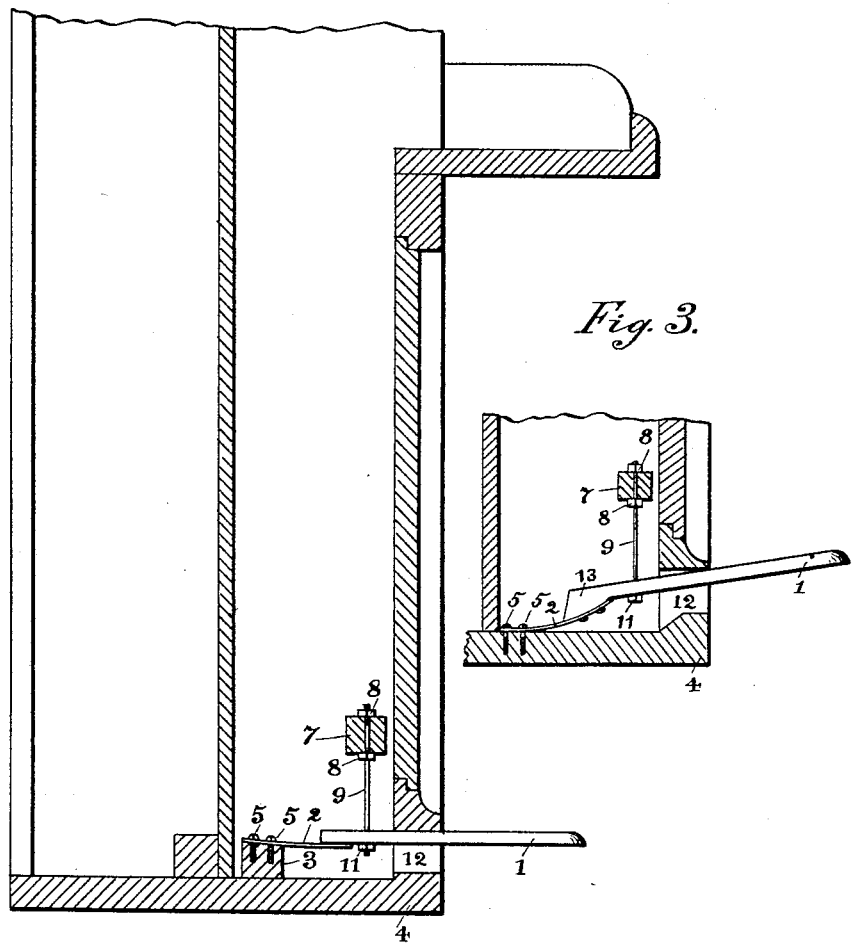
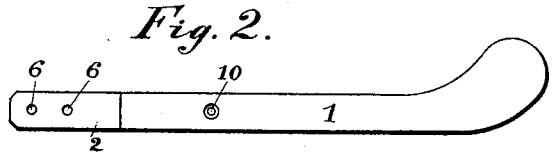
WITNESSES:
D. C. Reusch.
C. Sedgwick.
INVENTOR:
O. Lestina
BY Munn & Co.
ATTORNEYS.

United States Patent Office.

OTTO LESTINA, OF DERBY, CONNECTICUT.

PIANO-PEDAL.

SPECIFICATION forming part of Letters Patent No. 392,737, dated November 13, 1888.

Application filed January 6, 1888. Serial No. 259,936. (No model.)

*To all whom it may concern:*

Be it known that I, OTTO LESTINA, of Derby, in the county of New Haven and State of Connecticut, have invented a new and Improved Piano-Pedal, of which the following is a full, clear, and exact description.

This invention relates to an improvement in piano-pedals, and has for its object to provide a piano-pedal which will be simple in construction, effective in operation, and durable.

The invention consists in a piano-pedal constructed and arranged as hereinafter described and claimed.

Reference is to be had to the accompanying drawings, forming a part of this specification, in which similar figures of reference indicate corresponding parts in all the views.

Figure 1 represents an upright piano, partly in vertical section and broken away, showing the invention applied thereto; and Fig. 2 is a plan view of the pedal detached. Fig. 3 represents another method of attaching the pedal, with parts broken away and in section.

In the ordinary construction of pianos the pedal is fulcrumed near its rear end to a support, and has its rear end connected with a frame which is moved against the piano-strings to muffle them. The pedal is pivoted on a screw or pin resting in blocks mounted on a support, and is provided at its pivotal point with a spring to hold it in normal position. By means of my device the blocks and pin and old form of spring are dispensed with.

In carrying out this invention, which is adapted to any form of piano, a pedal, 1, is employed having one end of an elastic metallic strip, 2, riveted or secured in any suitable way to its inner end. The other end of strip 2 may be secured to a block or support, 3, in the piano-casing in any suitable manner, as shown, by means of screws 5, passing through holes 6 in the strip 2. For the purposes of illustration only the bar or rod connecting the pedal with the works of the piano need be shown. 7 indicates such bar, having secured thereto by nuts 8 a rod, 9, passing through hole 10 in pedal 1 and secured thereto by nut 11. The pedal projects through an opening, 12, in casing 4, and in its normal position bears against the upper side of said opening. Of course it will be understood that the pedal above described and its connection are duplicated to provide two pedals for the bass and other notes, as in the old way. By means of this construction the pedal is not pivoted, but has an elastic connection in lieu thereof by means of the spring-strip 2. In this way squeaking is avoided, there is no wear of parts as in the case of the pivotal connections, the elastic plate 2 serves as a spring, and the construction is simple and effective. In using the pedal with square pianos the connections would be changed to adapt the pedal thereto; but the operation would be the same.

In Fig. 3 the strip 2 is fastened directly to the bottom of casing 4 instead of to block 3. The inner end of the pedal 1 is formed with the thickened and rounded portion 13 to permit of movement of the elastic strip 2 and the pedal 1.

Having thus described my invention, what I claim as new, and desire to secure by Letters Patent, is—

1. As a new article of manufacture, a piano-pedal constructed with an elastic metallic strip secured to and projecting from its rear end, substantially as described.

2. The piano-pedal 1 and elastic metallic strip 2, secured thereto, the pedal and strip being adapted to be attached to a piano, substantially as described.

3. In a piano, the combination, with pedal 1, having elastic metallic strip 2, secured thereto and to a support on the piano, of a rod connecting the pedal with the muffler, substantially as described.

OTTO LESTINA.

Witnesses:
THOS. S. BIRDSEYE,
HENRY D. BIRDSEYE.